United States Patent Office 2,733,238
Patented Jan. 31, 1956

2,733,238

REACTION OF STARCH AND ALKYLENE OXIDES

Ralph W. Kerr, Riverside, Ill., and William A. Faucette, Los Angeles, Calif., assignors to Corn Products Refining Company, New York, N. Y., a corporation of New Jersey No Drawing. Application February 23, 1951, Serial No. 212,514

16 Claims. (Cl. 260—233.3)

This invention relates to the production of starch derivatives, and in particular, starch ethers. Numerous methods for preparing starch ethers have been proposed heretofore, employing many types of etherifying agents, a variety of catalysts, and a great diversity of conditions. However, in spite of the voluminous literature describing the laboratory production and properties of numerous starch ethers, this information has largely remained of academic interest only. In spite of the fact that even a limited amount of derivatization achieved obvious improvements for industrial applications in the colloidal properties of starch, starch ethers have not become products of commercial importance, as compared to a number of commercial ethers of hydroxylated compounds much more costly than starch. This lack of general commercial exploitation of starch ethers, despite their advantages over underivatized starches, is attributable to the high cost involved in the methods of production heretofore utilized, technical difficulties encountered in purifying the ethers, and lack of a market or uses for crude products made by technically unsound procedures or marketed without satisfactory purification in order to minimize their cost, or combinations of these reasons.

For example, one of the most common methods of preparing starch ethers is to disperse the starch in aqueous alkali and add thereto an etherifying agent, such as dimethyl sulfate. Upon termination of the etherification, the solution is neutralized and heated to decompose unreacted dimethyl sulfate into methanol and sulfate ion. The chief difficulty with this method is that it is highly inefficient, since extremely large ratios of dimethyl sulfate to starch are required, with the result that the final solution may contain more salt, e. g. sodium sulfate, than starch. The expense entailed in removing such large amounts of salt from the water-soluble starch product renders this method impractical for industrial scale production of substantially pure starch ethers, so that the reaction mixture is merely concentrated and sold as an aqueous solution. However, the presence of the large amount of salt not only limits the usefulness of the material to a few applications wherein quantities of salts may be tolerated, but also adversely affects the colloidal properties, such as viscosity and clarity of the starch solution or dispersion, so that even in the few applications possible, its advantages can at best be only partially realized.

More recent modifications of the above method have endeavored to avoid these difficulties by limiting the amount of alkali used to that which is required to promote the reaction. Thus, a solvent such as liquid ammonia may be used as the reaction medium, and only sufficient sodium added to form a complex, which is believed to be an alcoholate, i. e. a compound wherein the alkali metal has replaced the hydrogen atom of an alcoholic hydroxyl group of the starch so as to enable it to react with an etherifying agent, such as methyl iodide. Alternatively, the starch may be heated in butanol with alkali to form the alkali starch. The latter may then be filtered from the butanol for subsequent reaction with an etherifying agent. It has also been proposed to dispense with the use of relatively costly non-aqueous solvents and add the alkali necessary to form the alcoholate or alkali starch complex directly to the starch. This is usually accomplished by adding a very concentrated aqueous solution of sodium hydroxide to the dry starch and stirring the mixture until complex formation has occurred. Even by thus reducing to the minimum the amount of alkali added, upon completion of the etherification sufficient salt still remains with the starch product in all of these procedures to impair the colloidal properties of the starch and limit its usefulness in many applications. Washing the product with water to remove the salt is possible if the derivatized starch product is water-insoluble, but this involves the obvious disadvantages of providing washing tubs, filters, and drying ovens, and may require repeated slurrying and filtering to obtain a satisfactory product, thus materially adding to the cost of the product, which is further augmented beyond normal for such operations by reason of the fact that the alkali treatment causes the starch to swell or become slimy, making filtration and drying difficult and slow. Furthermore, in the case of more highly derivatized and cold water soluble starch products, water obviously cannot be used to wash salts and other impurities from the starch product, and relatively costly non-aqueous solvents must be employed to purify the product.

Another variation of the above methods is to add a limited amount of alkali to the starch, which has previously been slurried in water, so that the alkali will be sufficiently dilute to avoid swelling of the starch. However, the use of dilute alkali is not conducive to the desired complex formation between the alkali and starch, but rather the excessive amount of water present favors dissociation of the complex, if it does form, so that the etherifying agent reacts with very low efficiency upon the starch thus treated. Furthermore, aqueous alkali promotes decomposition of the etherifying reagent to an inactive glycol or alcohol.

In another procedure, gelatinization in alkali solutions of sufficient concentration to enable efficient etherification is repressed by the addition of neutral salts, e.g. sodium chloride or sulfate. This method presents the obvious disadvantage that the deliberate addition of inorganic salts increases the amount of salt which must subsequently be removed in order to obtain a substantially pure starch ether of good colloidal characteristics.

Still other methods apparently concede that technical difficulties involved in purifying a water dispersible starch ether are insurmountable for practicable commercial operations, and completely ignore purification, being directed only to the production of very crude products. Thus, it has been proposed to mix starch, an alkaline material, and an etherifying agent in the presence of sufficient water to gelatinize the starch, and pass the mixture to heated rolls. No provision is made to remove unreacted etherifying agent, excess alkali, salts, or impurities or by-products.

It is among the objects of this invention to provide a process for the production of alkyl, aryl, and aralkyl ethers, and substituted alkyl, aryl, or aralkyl ethers of native or modified starches. It is a further object to provide a process for preparing such ethers in substantially pure form. It is also an object of this invention to provide a relatively low cost process for producing such starch derivatives. A further object is the production of water-dispersible starch ethers which have improved viscosity characteristics, greater paste clarity and greater colloidal stability in aqueous media than the underivatized starches.

Another object is to provide a practical method for producing starch ethers by an essentially dry process in a degree of purity such that the desirable colloidal properties of the starch ethers, such as viscosity, clarity, and solution stability, will not be adversely affected, and such that the uses of the starch ethers will not be severely restricted because of the presence of unreacted reagents, inorganic salts, or other impurities or by-products. Still another object is the production of substantially pure starch ethers by an essentially dry method employing reagents, catalysts, and adjuncts of such nature that the starch ether may be recovered in condition for use without the utilization of procedures involving washing with and recovery from water or other solvents. Other objects and advantages will appear hereinafter.

We have discovered that starch in a substantially dry state reacts with volatile, gaseous or vaporizable etherifying agents with a surprisingly high degree of etherification efficiency in the presence of certain catalysts, and that the starch derivatives thus prepared may be purified of unreacted reagents by the simple expedients of reducing the pressure within the reactor, heating sweeping the interior of the reactor with an inert gas, or various combinations of these means.

Briefly, our process comprises treating substantially dry starch with a volatile, gaseous or vaporizable etherifying agent, such as an organic epoxy compound, in the presence of catalytic amounts of a quaternary base or a tertiary amine capable of forming a quaternary base by reaction with the etherifying agent. If desired, an adjunct, as hereinafter described, may be used to facilitate uniform distribution of the catalyst throughout the mass of starch to be derivatized. Impurities, e. g. excess etherifying agent and adjunct may be removed by volatilization, e. g. reducing the pressure in the reactor, heating, drawing a stream of inert gas through the reactor, or a combination of these, to recover the starch derivative in a substantially pure form.

The starch used in practicing our invention may be derived from any plant source, such as corn, potato, wheat, tapioca, waxy maize, grain sorghum, etc. The starch may be native, i. e. unmodified starch or may have been previously modified, for example, by treatment with acids, alkalies, enzymes, or oxidizing agents. Soluble or partially soluble modified starches, dextrins, pregelatinized products, such as roll-dried starches, or starch products solubilized by other means are also suitable for use in our process.

Although one of the advantages of our process accrues from being able to use dry starch in the granular state and maintain the starch in a cold water insoluble state, derivatization by our process may be extended to any desired degree by employing appropriate conditions and amounts of reagents, so that soluble or partially soluble starch ethers may be obtained, if desired. The properties of the starch ethers obtained according to our process may also be varied, for example, from an insoluble to soluble or partially soluble condition, by applying known modification procedures to the starch derivative obtained by our process, e. g. by gelatinizing an insoluble ether and drying the paste, as by roll-drying operations, subsequent to derivatization.

The starch used in practicing our invention is preferably in a substantially dry state, by which term we mean starch having a moisture content equivalent to or below that common to commercial or ordinary dry starch, i. e. approximately 10 to 20 per cent or less.

Etherifying agents suitable for use in our process include epoxyalkanes and substituted epoxyalkanes, such as ethylene oxide; propylene oxide; epichlorohydrin (chloropropylene oxide); styrene oxide (phenylethylene oxide); butadiene monoxide (vinylethylene oxide); glycidol (hydroxy-propylene oxide) and its derivatives, e. g. glycidyl isopropyl ether, glycidyl phenyl ether, and other alkyl, aryl, aralkyl, or halogen derivatives of glycidol; and any mixtures of the above types of compounds.

Compounds which are effective as catalysts in our process are quaternary bases and tertiary amines capable of reacting with the etherifying agent to form quaternary bases. Among suitable catalysts for use in our process, there may be mentioned, by way of examples, tetra-(hydroxyalkyl)ammonium hydroxides (tetralkanolammonium hydroxides); trimethylbenzylammonium hydroxide; trialkylamines, such as trimethylamine, triethylamine, tripropylamine; tri(hydroxyalkyl)amines (trialkanolamines) such as tri(hydroxyethyl)amine (triethanolamine); and tetralkylammonium hydroxides. By reason of practical considerations, primarily cost of reagent, tri-(hydroxyethyl)amine (triethanolamine) is a preferred catalyst.

It is our belief, although we do not base our invention on this hypothesis, that when the amines other than quaternary bases are employed as catalysts, such amines are converted into quaternary base in situ through a reversible reaction with a portion of the etherifying agent, and that the quaternary base is the active catalyst. Thus, for example, if triethanolamine is added to the starch to be treated as the catalyst and propylene oxide is employed as the etherifying agent, the triethanolamine may react with a portion of the propylene oxide to form tri(hydroxyethyl)hydroxyisopropylammonium hydroxide, which in turn catalyzes the reaction of the remainder of the propylene oxide with the starch.

We have further found that uniform distribution of the catalyst throughout the dry starch is aided by the use of an adjunct such as a volatile solvent carrier for the catalyst, e. g. alcohols or small quantities of water. The amount of adjunct employed should be insufficient to permit gelatinization of the starch, and advantageously just sufficient to procure uniform distribution of the catalyst throughout the mass of starch. Amounts of adjuncts within the range of about 5 to about 15 per cent by weight of the starch are satisfactory in most cases. If desired, trace amounts of surface active agents may be dissolved in the solvent employed as adjunct, to further assist in catalyst distribution. This expedient is particularly useful when employing water as the adjunct.

The amount of etherifying agent used depends primarily upon the degree of substitution desired in the final product. We have used amounts varying from approximately 0.05 mole to approximately 1.5 moles per molar weight of starch (about 180 grams for starch at commercial moisture contents). Starches treated with the lower ratios of etherifying agent, e. g. about 0.1 mole, are insoluble in cold water, unless, of course, the starch treated was a soluble or partly soluble modification. Those treated with the higher ratios become increasingly soluble with increasing ratios of etherifying agent, to the point where products showing complete solubility in cold water may be obtained from insoluble starting material.

Since etherification efficiency in our process is substantially 100 per cent, it is not necessary to use any appreciable excess of etherifying agent; i. e. if a product of 0.1 degree of substitution (D. S.) is desired, about 0.1 mole of etherifying agent per molar weight of starch is indicated. However, if a tertiary amine is employed as catalyst rather than a quaternary base, an additional amount of etherifying agent equivalent to the amount of tertiary amine catalyst should be added to allow for the amount required to form the quaternary base with the catalyst.

Time and temperature of the reaction are not critical, and are interdependent variables. Thus, while the preferred temperature range is from about 40° C. to about 70° C., requiring reaction times of about 3 to about 10 hours, temperatures as low as about 18° C. have been used with correspondingly longer reaction time, about 24 hours. Higher temperatures with shorter reaction periods may also be used.

During the purification step subsequent to the etherification, removal of impurities is facilitated by increase of the temperature, although the temperature used in this step is not critical. Any convenient temperature may be used, depending somewhat upon the volatility of the particular etherifying agent and adjunct used. This temperature is also somewhat dependent upon the duration of the purifying step and the particular conditions of this step, i. e. whether or not reduced pressures and/or sweeping with an inert gas are also utilized to promote removal of the impurities. With temperatures within the range of about 80° C. to about 100° C., accompanied by reduced pressure and sweeping of the reactor with air, purification may be accomplished within a period of about 30 minutes to about 5 hours. The length of time required for purification depends upon the particular conditions employed in this step and also upon the amount of starch product being purified. For a given set of conditions, the larger the batch, the longer the period necessary to effect purification.

The amount of catalyst used depends to a certain extent upon the degree of substitution desired to be attained in the starch undergoing treatment. Amounts ranging from 0.00025 mole to 0.1 mole for every 0.1 mole of etherifying agent have been used. However, etherification efficiency is usually low if less than 0.001 mole per molar weight of starch is employed. To obtain a starch ether having a degree of substitution of 0.1, a minimum amount of the order of 0.005 mole per molar weight of starch is required. In general, the preferred range is 0.0075 to 0.015 mole of catalyst for every 0.1 mole of etherifying reagent.

Starch derivatives having a degree of substitution from 0.05 to 1.5 D. S. may be prepared according to the process of this invention.

One of our preferred procedures for the preparation of hydroxyalkyl starch ethers by our improved method comprises spraying starch, which is being agitated in a closed vessel, with an alcohol or a dilute solution of a wetting agent in an amount just sufficient to wet the starch uniformly and assist in uniform distribution of the catalyst. The catalyst is then likewise atomized onto the starch in a fine spray followed by the addition of the etherifying agent, either as a gas or liquid, depending upon the vapor pressure of the compound at room temperature. The reaction mixture is then heated, preferably at about 40° C. to about 70° C., until the desired degree of etherification has been reached.

When the etherification has been completed, the pressure in the reactor is reduced while admitting a small stream of air at the other end and the temperature is raised. By this means catalyst, adjunct, any unreacted epoxide, and, in general, volatilizable impurities are removed from the etherified starch product.

The moisture content of the product as discharged from the reactor usually varies from about 12 to about 15 per cent when starting with starch of normal commercial moisture content. The etherified starch is ready for use as discharged from the reactor.

For laboratory scale preparations, a 1½ liter, stainless steel, jacketed vessel fitted with a top which was bolted to the vessel through a rubber gasket was employed as the reactor. The lid was provided with a ¾ inch hole for filling the reactor and removing samples, with a stainless steel threaded cap, a ⅛ inch relief petcock, a ¼ inch gas cock, a fitting for sealing a glass dropping funnel through the lid, and a packing gland in the center, 2 inches long by ½ inch internal diameter, which carried a ½ inch shaft attached to an agitator. The agitator swept the sides and bottom of the vessel so as to provide efficient agitation for the starch. Holes were provided in the agitator so that the blade would cut through the dry starch mass.

In the pilot plant, a Stokes rotary vacuum drier was employed as the reactor. This equipment consists of a horizontal, jacketed, stainless steel tank of about 500 pounds' capacity, provided with a four knife, blender type agitator.

A commercial dextrin cooker, such as the vacuum cooker type, also affords a satisfactory reactor. The main points to be considered in choosing equipment for executing the process of this invention are good heat exchanger throughout the starch, good agitation in order to keep the layer of powdered starch adhering to the sides of the reactor at a minimum, and a closed vessel capable of retaining the vapor of the volatile etherifying agent, catalyst, and adjunct.

When starch or similar high polymers are partially etherified to the extent indicated in many of our examples, chemical analysis specific for ether groups for the purpose of ascertaining the degree of etherification of the starch is extremely difficult, as the results are often of the same order of magnitude as the experimental error of the method. Accordingly, indirect evidence must usually be employed, e. g. comparison of the paste properties of the product with the untreated starch. Thus, a small degree of etherification with hydroxyethyl or hydroxypropyl groups may lower the gelatinization temperature, increase the clarity and hot paste viscosity of a cereal starch, and decrease the gelling tendency of the cooled paste. For these tests we employed the Brabender Amylograph, operated in the manner outlined on page 127 of Chemistry and Industry of Starch (2nd edition, 1950, Academic Press).

Samples of unreacted corn starch, washed and unwashed reaction products were each slurried in water at 6.7 per cent solids content. The slurries were heated through a gelatinization cycle, followed by a cooling period, in the Amylograph, with the results noted in Table I.

From these results it may be observed that although the reacted starch has a higher peak, hot paste viscosity, the paste is more fluid after cooling than the paste of the unreacted starch. This is due to reduced gelation in the reacted starch. This explanation is borne out by observing the effects of reheating and recooling the pastes, whereby it may be observed that in the first cooling cycle, the unreacted starch formed an irreversible gel since the paste does not thin out materially upon reheating and sets up rapidly again upon recooling. In contrast, the reacted starch becomes very fluid upon reheating and reassumes a long-bodied viscous state upon recooling. The reheating and recooling procedure may be repeated several times with similar results, indicating complete reversability of the viscosity changes with temperature and the virtual absence of irreversible gel formation in pastes made from the reacted starch. It may be further observed from the results noted in Table I that both the washed and unwashed samples of starch ethers prepared according to our process behaved similarly when gelatinized.

Furthermore, upon prolonged standing at room temperature, pastes made from the unreacted starch set to an opaque, immobile gel; whereas those from the reacted starch remain relatively clear and free-flowing.

However, gelatinization characteristics and other physical properties are not in themselves conclusive proof of etherification, although such physical tests are useful in controlling etherification, once actual derivatization has been definitely established by chemical tests. It is well known that the paste or sol properties of starches, such as gelatinization temperature, viscosity, and gelation, can be altered by means other than derivatization. Thus, for example, the gelatinization temperature of starch may be lowered by means of certain additives, such as some of the aliphatic alcohols, or even by such simple expedients as changing the pH. Soaps and fatty acids merely mixed with starch increase its viscosity and reduce gelation. Also, polyalkylene glycols reduce gelation in a cereal starch paste and give a freer flowing, more mobile mass.

Furthermore, it is well known that alkylene oxides undergo a hydrolysis reaction in the presence of water, whereby the epoxide ring is opened and a glycol is formed. Therefore, when an alkylene oxide, e. g. ethylene oxide, has been employed for the derivatization of starch, under some of the conditions described in the prior art, it is probable that a portion of the oxide was hydrolyzed by the water present to the corresponding glycol, which subsequently reacted with further oxide, ultimately resulting in the formation of polyalkylene glycols, e. g. a polyethylene glycol. Accordingly, it is quite likely that the alteration in physical properties of the starch products obtained, purported to be evidence of etherification, was due to the aforesaid effects of polyethylene glycols on the properties of the starch pastes.

One of the most sensitive tests to establish etherification in starch, which may even be used to ascertain degree of etherification, is the determination of alkali number, as described, on page 679, and illustrated, on page 682, of Chemistry and Industry of Starch (2nd edition, 1950, Academic Press).

Alkali number is a convenient means for determination of alkali lability, which appears to be associated with chain degradation, state of aggregation of micellar complexes, and chemical modification. However, its chemistry is still obscure. Nevertheless, it is extremely useful in determining the nature of starch products. For example, during acid hydrolysis of a starch product, the alkali number increases progressively as the reaction proceeds. The converse is true with an etherification reaction. In the latter case, the alkali number decreases as the reaction proceeds, i. e. with increasing degree of etherification. Thus, by comparison of the alkali number of a starch material subjected to a condition intended to produce a starch ether with that of the untreated starch, it is possible to ascertain whether or not etherification has actually occurred.

The following examples which are intended as informative and typical only, and not in a limiting sense, will further illustrate our invention.

EXAMPLE 1

One hundred and eighty grams of corn starch (one molar unit of weight of starch at commercial moisture content) was charged to the laboratory reactor described above and agitated while 20 ml. of isopropyl alcohol was sprayed in, followed by 5 grams of a 40 per cent aqueous solution of tetraethanolammonium hydroxide (tetra(hydroxyethyl)ammonium hydroxide), which provided a catalyst concentration of 0.009 mole. Then 5.8 grams (0.1 mole) of propylene oxide was added from a dropping funnel, while continuing agitation of the starch, during a period of 10 minutes. When all of the propylene oxide had been added, the reaction mixture was heated to a temperature of 50° C. to 60° C. and maintained at this temperature, with agitation, for 6 hours. At the end of this time, a sample was removed from the reactor for the tests described below.

A partial vacuum was then applied to the reactor, the temperature was raised to 80° C. to 100° C., and a very small stream of air was pulled through the reactor for 30 minutes. The starch was then cooled and analyzed without further treatment.

The sample taken at the end of the reaction period was suspended in water, adjusted to pH 6.0 with HCl, filtered and dried. This sample was purified by standard washing procedures, in order to provide a basis for comparison with the properties of products made by our process, in which purification is effected without washing. The properties of the washed and unwashed product, and those of the original corn starch are compared in Table I below:

Table I

HEATING AND COOLING PASTES IN THE BRABENDER AMYLOGRAPH

| Observation | Starch | | |
|---|---|---|---|
| | Unreacted Corn Starch | Washed Product | Unwashed Product |
| Gelatinization temperature, °C | 85 | 73 | 72. |
| Peak hot paste viscosity [1] | 300 | 425 | 420. |
| Viscosity, 15 min. at 95° C | 250 | 120 | 120. |
| Viscosity, cooled to 20° C | 1,000+ | 650 | 660. |
| Viscosity, reheated to 95° C | 640 | 60 | 60. |
| Viscosity, recooled | 1,000 at 35° C. | 580 at 20° C. | 580 at 20° C. |

[1] Viscosity is given in Brabender units, the limit of the graph being 1,000 units.

Both the washed and unwashed product had an alkali number of 4.5, whereas the original corn starch had an alkali number of 9.0. These results not only establish that etherification has been accomplished in the starch, but show that the reaction was substantially quantitative, and that a starch ether with a degree of substitution of one ether group per 10 glucose units (D. S.=0.1) was obtained.

EXAMPLE 2

Example 1 was repeated but using a ten-fold increase (0.1 mole) of the catalyst, tetraethanolammonium hydroxide. No measurable change in properties from those of the product made in Example 1 resulted, proving that in the first instance that catalytic amounts of the base are very effective in promoting the reaction and that molar equavilents of the base are not required.

EXAMPLE 3

The procedures given in Example 1 were repeated except that only 3.75 grams of a 40 per cent solution of tetraethanolammonium hydroxide was used, or 0.0075 mole of catalyst per molar weight of starch.

Table II

HEATING AND COOLING PASTES IN THE BRABENDER AMYLOGRAPH

| Observation | Product of Example 3 |
|---|---|
| Gelatinization temperature, °C | 64 |
| Peak hot paste viscosity | 420 |
| Viscosity, 15 min. at 95° C | 190 |
| Viscosity, cooled to 20° C | 500 |

EXAMPLE 4

The procedures given in Example 1 were repeated except that only 2.5 grams of a 40 per cent solution of tetraethanolammonium hydroxide was used, or 0.0045 mole of catalyst per molar weight of starch.

The product made in Example 3 was substantially the same as the product made in Example 1, but the product made in Example 4 resembled unreacted starch in its paste properties and formed a gel when the cooked paste was allowed to stand at room temperature. These two examples indicate that the minimum amount of catalyst required to produce a starch ether of D. S.=0.1 by our preferred procedures is of the order of 0.005 mole per molar weight of corn starch.

EXAMPLE 5

The procedures given in Example 1 were repeated except that 180 grams of an acid modified, thin-boiling corn starch was used as substrate instead of the untreated, thick-boiling grade of corn starch.

The paste characteristics of the original, 20 fluidity grade of corn starch used in the example are compared with the reacted starch in Table 3. The alkali number of the substrate starch was 11.5; that of the product, 6.0.

Table III

| Observation | 20-F Corn Starch | Etherified 20-F Corn Starch |
|---|---|---|
| Gelatinization temperature, °C | 58 | 65 |
| Peak hot paste viscosity | 700 | 410 |
| Viscosity, 15 min. at 95° C | 0 | 190 |
| Viscosity, cooled to 40° C | 400 | 420 |
| Viscosity, cooled to 25° C | 900 | 560 |

The above observations were made on pastes at 13.5 percent dry solids in water.

In a similar manner, starch ethers have been prepared from other grades of modified corn starch with comparable results. In all cases the product was dispersible in hot water forming a clear, mobile sol, very much more stabilized in viscosity than the parent starch, characteristics which enhance the use of these products for many industrial applications such as the preparation of adhesives and sizes for paper and textiles. Thus, for example, a warp size made from the product of Example 5, compared to a size made from the unreacted 20-fluidity corn starch does not change in viscosity so drastically with temperature. This permits a more uniform application of the size at the slashers. On drying the yarns and cooling to room temperature, the size films on the yarns are less brittle and more tenacious, which results in less shedding of size and greater protection for the yarns during the weaving operation and gives the goods a softer "hand" and more natural appearance for a given weight of added size. Furthermore, the greater transparency of the size results in less masking of the textile fibers, an important characteristic when yarns are dyed before the weaving operation.

EXAMPLE 6

Two hundred and fifty pounds of corn starch was charged to a Stokes vacuum drier (a horizontal jacketed tank with a blender type agitator) and stirred while 3.5 gallons of 99 per cent isopropyl alcohol was sprayed into the starch followed by 6.95 pounds of 40 per cent tetraethanolammonium hydroxide. Then 8.1 pounds of propylene oxide was run into the reactor and the starch heated to 50° C. for 5 hours. A vacuum of 23 inches gauge was then pulled on the reactor for 45 minutes, during which time 2.25 gallons of isopropyl alcohol with some water was removed and condensed, as the temperature was allowed to rise to 80° C. to 100° C. The starch product was removed and showed characteristics substantially the same as the product of Example 1.

A part of the starch was made into a slurry with water at a solids concentration corresponding to 20° Bé. This was passed between rollers heated with 90 p. s. i. steam pressure during which operation the starch ether was gelatinized and the paste dried. This product was ground to pass a 100 mesh screen. It was found that the product was cold water dispersible and compared to a roll-dried product made from underivatized corn starch, dispersed very much more readily to give a paste very much more homogeneous in respect to dispersed particle size.

Another part of the starch (not roll-dried) product was mixed in a blender with sugar and flavoring in the following proportions:

100 pounds starch
    50 pounds cane sugar
    21 pounds cocoa
    700 pounds water This was brought to a boil with heat and the mass then fed to double metal rollers heated with 90 p. s. i. steam pressure. The product was ground to a powder and dry blended with 0.5 pound of salt, 35 pounds of pulverized cane sugar and 15 pounds of pulverized dextrose. This pudding powder when stirred in a ratio of 25 grams to 100 ml. of cold milk gave almost immediately and without heating a smooth textured pudding, of good flavor and the consistency of a blanc mange dessert. The pudding powder did not lose its desirable characteristics with age. In particular, characteristic off-flavors common to roll-dried starches did not develop. Unreacted corn starch when made into a roll-dried pudding powder in the manner described for the etherified starch, formed a very rough textured pudding even after prolonged stirring to disperse the starch and the powder developed characteristic off-flavors in storage.

EXAMPLE 7

The procedures given in Example 1 were repeated with the exception that the reaction temperature was reduced to between 18° C. and 22° C. and the reaction time extended to 24 hours. This product was very similar in properties to the product made in Example 1, as is shown from observations made when the starch was gelatinized in the Brabender Amylograph:

Gelatinization temperature _____ °C__ 60
Peak hot paste viscosity _____ Brabender units __ 320
Viscosity, 15 min. at 95° C _____ do ____ 260
Viscosity, cooled to 20° C _____ do ____ 640

EXAMPLE 8

Procedures given in Example 1 were repeated with the exception that 4.4 grams (0.1 mole) of ethylene oxide was added as a cooled condensed liquid instead of the propylene oxide used in the first example. The product was very similar in paste properties to that made in Example 1, as is shown from observations made using the Brabender Amylograph:

Gelatinization temperature _____ °C__ 71
Peak hot paste viscosity _____ Brabender units __ 285
Viscosity, 15 min. at 95° C _____ do ____ 200
Viscosity, cooled to 20° C _____ do ____ 570

The alkali number for the treated starch was 4.8.

EXAMPLE 9

The procedures given in Example 1 were repeated with the exception that 7.0 grams (0.1 mole) of butadiene monoxide (vinylethylene oxide) was added instead of the propylene oxide.

EXAMPLE 10

The procedures given in Example 1 were repeated with the exception that 11.4 grams of glycidyl allyl ether was used in place of the propylene oxide.

It was observed that samples taken at the end of the reaction period in both Examples 10 and 11 had paste properties quite similar to the hydroxypropyl starch derivative made in Example 1. However, as the temperature of the reactor was raised and the time of heating extended, both starches tended to become non-gelatinizable in water, indicating that the unsaturated bonds in the substituent groups had induced polymerization between these groups thus producing cross-linkages between the starch molecules with resulting insolubility.

It was observed, furthermore, that samples taken at the end of the reaction period, pasted in water and applied as films to flat surfaces, on drying and further heating at temperatures between 70° C. and 100° C., developed water insolubility. This discovery is important industrially. The unsaturated starch ethers at the end of the etherification reaction period may be dispersed as a sol in water, a very inexpensive medium, and applied therefrom as adhesives, or as sizes for paper and textiles, or applied in coatings or as films or extruded into fibers and thereafter polymerized into a solvent insoluble state by the simple expedient of applying heat.

EXAMPLE 11

The procedure in Example 1 were repeated with the exception that 9.27 grams (0.1 mole) of epichlorohydrin (chloropropylene oxide) was added instead of the propylene oxide.

This product would not gelatinize in water even at the boiling point and, for this degree of derivatization, indicated that it was, in part at least, a cross-linked derivative. Thus, apparently, the chlorohydroxypropyl starch ether formed in the primary reaction had in turn reacted, under the conditions used in this example, through the chloro radical on the substituent group with underivatized hydroxyls on other starch molecules, thereby forming a hydroxypropylene diether cross-linkage which prevented the starch derivative from dispersing in hot water.

EXAMPLE 12

The procedures given in Example 1 were repeated with the exceptions that 1.79 ml. of triethanolamine (tri-(hydroxyethyl)amine) in a like volume of water was added as catalyst in place of the tetraethanolammonium hydroxide, and that the amount of propylene oxide reagent was increased to 6.5 grams. Of this propylene oxide, 0.7 gram was added for the purpose of reacting in situ with the triethanolamine to form the quaternary base, tri(hydroxyethyl)hydroxyisopropylammonium hydroxide, leaving a balance of 5.8 grams (0.1 mole) to react with the starch to form the hydroxypropyl starch ether.

The product from this example proved on analysis to be quite similar to the product formed in Example 1, and was accordingly a 0.1 D. S. hydroxypropyl corn starch ether.

| | |
|---|---|
| Gelatinization temperature | °C 73 |
| Peak hot paste viscosity | Brabender units 430 |
| Viscosity, 15 min. at 95° C | do 130 |
| Viscosity, 20° C | do 700 |
| Viscosity, reheated to 95° C | do 100 |
| Viscosity, recooled to 20° C | do 650 |
| Paste pH | 6.7 |
| Total nitrogen | per cent 0.10 |
| Alkali number | 4.8 |

It was observed, particularly in the case of this example, that lowering the pH value of the paste to as low as 2.0 did not affect its colloidal properties, such as viscosity, plasticity and sol stability, which is the case with many starch ethers such as carboxymethyl starch. This characteristic of stability to acid is very important industrially since many applications for starch products are at pH levels less than 7.0.

EXAMPLE 13

The procedures given in Example 1 were repeated with the exception that 0.96% gram of triethylamine in 1.0 ml. of water was added as catalyst in place of the tetraethanolammonium hydroxide. This product was also quite similar to the product made in Example 1.

| | |
|---|---|
| Gelatinization temperature | °C 72 |
| Peak hot paste viscosity | Brabender units 350 |
| Viscosity, 15 min. at 95° C | do 130 |
| Viscosity, cooled to 20° C | do 430 |
| Total nitrogen | per cent 0.10 |

EXAMPLE 14

The procedures given in Example 1 were repeated, except that 0.01 mole of trimethylamine to one molar weight of starch was used as the catalyst. A hydroxypropyl corn starch ether with properties, as described for the product of Example 1, was produced.

EXAMPLE 15

The procedure of Example 1 was repeated except that 0.01 mole of trimethylbenzylammonium hydroxide was employed as the catalyst in place of the tetraethanolammonium hydroxide. The hydroxypropyl starch ether produced had properties as described for the product made in Example 1.

On analysis, the product contained 0.098 per cent N. A portion of this sample was allowed to remain in the reactor and while drawing a small stream of air through the starch, it was heated to 80° C. to 100° C. for an additional 2.5 hours. This product showed on analysis 0.074 per cent N. Corn starch normally contains very nearly this amount of N due to compound or complex formation of the grain carbohydrate with plant protein. The corn starch used in these examples analyzed 0.05 per cent N.

EXAMPLE 16

The procedures given in Example 1 were repeated with the exception that 20 ml. of water containing 0.2 gram of a surface active agent (polyoxyethylene sorbitan monolaurate) sold by the Atlas Powder Company under the trade mark "Tween-20" dissolved therein was substituted for the isopropyl alcohol. The product in all respects was quite similar to the product made in Example 1.

| | |
|---|---|
| Gelatinization temperature | °C 74 |
| Peak hot paste viscosity | Brabender units 410 |
| Viscosity, 15 min. at 95° C | do 120 |
| Viscosity, cooled to 20° C | do 720 |
| Viscosity, reheated to 95° C | do 95 |
| Viscosity, recooled to 20° C | do 680 |
| Alkali number | 4.8 |

EXAMPLE 17

Corn starch was preoxidized by treating with approximately 1.5 per cent chlorine as sodium hypochlorite, thereby creating carboxyl groups in the starch molecules by oxidation of carbonyl and alcoholic hydroxyl groups. One hundred and eighty grams of this oxidized starch was charged to the laboratory reactor, described above, and stirred, while 20 ml. of water containing 0.2 gram of "Tween-20" wetting agent dissolved therein was sprayed into the starch, followed by 1.79 grams of triethanolamine as a 50 per cent aqueous solution. Then 6.8 grams of propylene oxide was added from a dropping funnel over a period of about 10 minutes. The temperature was raised to 50° C. to 60° C. and the reaction mixture maintained at this temperature, with constant agitation, for a period of 6 hours. Thereafter, a partial vacuum was applied to the reactor, the temperature raised to 80° C. to 100° C. and a small stream of air drawn through the reactor for 30 minutes. The etherified starch product, containing both hydroxypropyl and carboxyl groups, was then cooled and removed from the reactor.

The product showed, on analysis, 0.1 per cent carboxyl content using the calcium acetate, ion exchange procedure described on page 687 of the second edition of Chemistry and Industry of Starch, edited by R. W. Kerr.

The alkali number of the oxidized starch substrate was 9.5, that of the etherified oxidized starch was 5.6.

Sols made by heat gelatinizing the carboxy starch and the hydroxypropyl, carboxy starch in water at a solids content of 5 per cent by weight in water, were made and compared. The sol of the etherified starch product remained perfectly clear when cooled to and stored at room temperature whereas the sol made of the substrate starch became opalescent and finally cloudy. Although both sols had approximately the same viscosity as made, the sol made from the hydroxypropyl, carboxy starch retained its original viscosity on standing for 24 hours at room temperature, whereas the sol made of the substrate starch showed a 50 per cent viscosity increase under the same conditions.

EXAMPLE 18

One hundred and eighty grams of tapioca starch, containing approximately 10 per cent moisture, was charged to the laboratory reactor, described above, and stirred, while 20 ml. of water containing 0.2 gram of "Tween-20" dissolved therein was sprayed into the starch followed by 1.79 grams of triethanolamine as a 50 per cent aqueous solution. Then 6.8 grams of propylene oxide was added from a dropping funnel over a period of about 10 minutes. The temperature of the reactor was raised to 50° C. to 60° C. and the reaction mixture maintained at this temperature, with stirring, for a period of 6 hours. A partial vacuum was applied to the reactor, the temperature raised to 80° C. to 100° C. and a very small stream of air was pulled through the reactor for 30 minutes. The starch was then cooled and removed from the reactor.

The effect of etherification on the physical properties of tapioca starch is somewhat different from the effect of etherification on corn starch properties. In the former case, the principal effect and, perhaps, the major technical advantage gained by derivatization, is a stabilization of paste viscosity. The very high peak on gelatinization is eliminated, the viscosity does not suffer proportionately when the paste is held at a high temperature and a super-viscous condition does not result on cooling the paste to low temperatures.

|  | Untreated Tapioca | Etherified Tapioca |
|---|---|---|
| Gelatinization temperature, ° C | 63 | 64 |
| Peak viscosity, Brabender Units | 1,000 | 130 |
| Viscosity, 15 min. at 95° C., Brabender Units | 375 | 90 |
| Viscosity, cooled to 20° C., Brabender Units | 960 | 180 |

The above observations were made on pastes at 6.3 percent dry solids in water.

The gelatinization temperature of tapioca starch, already relatively low, is not further reduced by etherification to 0.1 D. S. by this method. Clarity of paste is improved and, at least in the hot paste state, the very long body, or "stringy" character of the paste, a disadvantage for many applications, is materially reduced. The ether, in common with the untreated tapioca starch, does not form an irreversible gel when the cooked paste is allowed to stand at room temperature.

We claim:

1. The process for the production of starch derivatives comprising etherifying substantially dry starch with an etherifying agent from the group consisting of compounds having the formula:

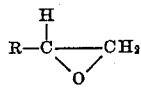

wherein R may be a radical from the group consisting of hydrogen, alkyl, halogenated alkyl, alkylene, and an alkyl radical to which is attached an alkylene hydrocarbon radical by an ether linkage, and mixtures thereof, in the presence of a catalyst from the group consisting of quaternary ammonium hydroxides, trialkyl amines, tri (hydroxyalkyl) amines, and mixtures thereof.

2. Process according to claim 1 wherein the etherifying agent is propylene oxide.

3. Process according to claim 1 wherein the etherifying agent is ethylene oxide.

4. Process according to claim 1 wherein the etherifying agent is vinyl ethylene oxide.

5. Process according to claim 1 wherein the etherifying agent is glycidyl allyl ether.

6. Process according to claim 1 wherein the etherifying agent is epichlorohydrin.

7. Process according to claim 1 wherein the catalyst is triethanolamine.

8. Process according to claim 1 wherein the catalyst is tetraethanol ammonium hydroxide.

9. Process according to claim 1 wherein said dry starch has a moisture content not exceeding approximately 20 per cent, said catalyst is present in the amount of at least about 0.001 mole per molar weight of starch and the etherification is carried out at a temperature within the range of about 18° C. to about 70° C.

10. Process according to claim 1 wherein the resulting derivatized starch is purified by volatilization of impurities.

11. Process according to claim 1 wherein the etherification is carried out at a temperature within the range of about 18° C. to about 70° C. and thereafter the reaction mixture is subjected to a partial vacuum, the temperature raised to within the range of about 80° C. to about 100° C. and a small stream of inert gas is drawn through the reaction vessel for a period of time within the range of about 30 minutes to about 5 hours.

12. Process according to claim 1 wherein the derivatized starch is slurried in water and the slurry is subjected in a thin film to heat and pressure by a heated body to gelatinize and dry the derivatized starch.

13. Process according to claim 11 wherein said starch is treated with an organic wetting agent for starch in an amount just sufficient to uniformly wet said starch but not react with the starch prior to the addition of said catalyst to said starch.

14. Process for the preparation of water insoluble films, filaments and fibers of starch ethers comprising reacting substantially dry starch with glycidyl allyl ether in the presence of a catalyst from the group consisting of quaternary ammonium hydroxides, trialkyl amines, tri (hydroxyalkyl) amines, and mixtures thereof, removing impurities; pasting the purified starch ether with water; imparting the desired form to the pasted starch ether; and heating the form to produce water insolubility therein.

15. Process according to claim 14 wherein the glycidyl allyl ether is replaced by vinyl ethylene oxide.

16. Process for the production of a starch ether comprising treating a substantially dry starch with polyethylene sorbitan monolaurate in an amount sufficient to wet said starch uniformly without gelatinizing the same; reacting the treated starch with propylene oxide in the presence of a catalytic amount of triethanol amine, at a temperature within the range of about 18° C. to about 70° C. for a period of about 24 to about 3 hours and removing impurities from the starch ether thus obtained by volatilization of said impurities.

References Cited in the file of this patent

UNITED STATES PATENTS

| 2,316,129 | Bock et al. | Apr. 6, 1943 |
| 2,372,337 | Pacsu et al. | Mar. 27, 1945 |
| 2,500,179 | Hinz et al. | Mar. 14, 1950 |
| 2,516,632 | Kesler et al. | July 25, 1950 |
| 2,516,633 | Kesler et al. | July 25, 1950 |
| 2,524,400 | Schoene et al. | Oct. 3, 1950 |
| 2,554,143 | Hinz et al. | May 22, 1951 |